June 9, 1942.   C. E. KERR   2,285,586
LIQUID DENSITY RESPONSIVE APPARATUS
Filed March 22, 1939   2 Sheets-Sheet 1
FIG_1_
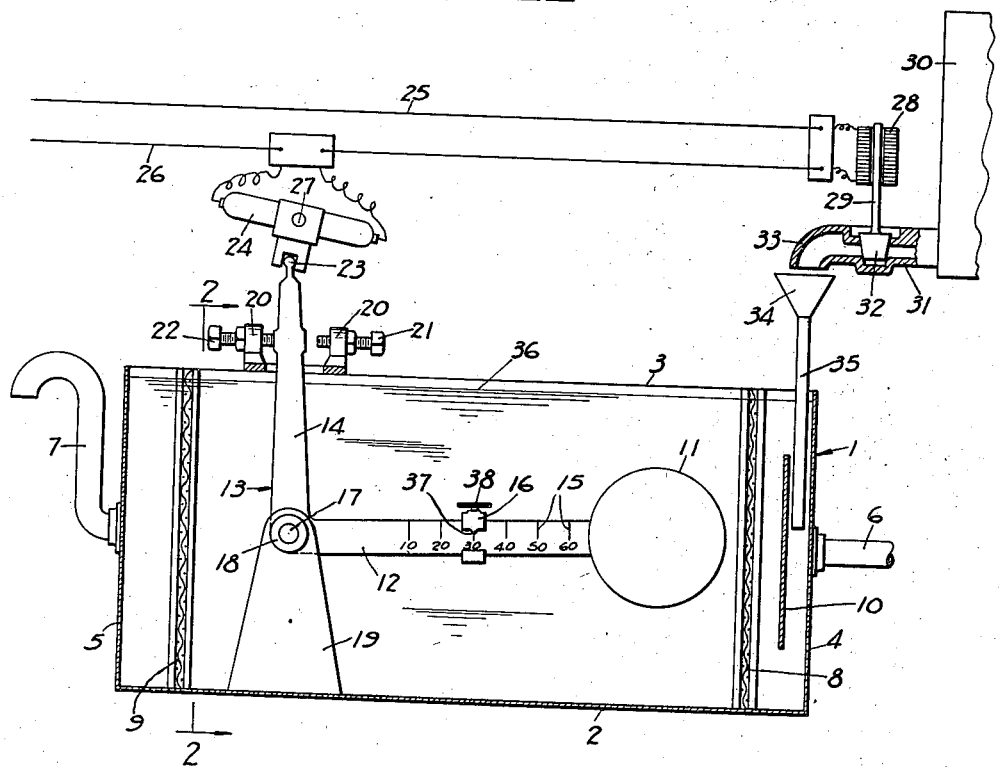
FIG_2_
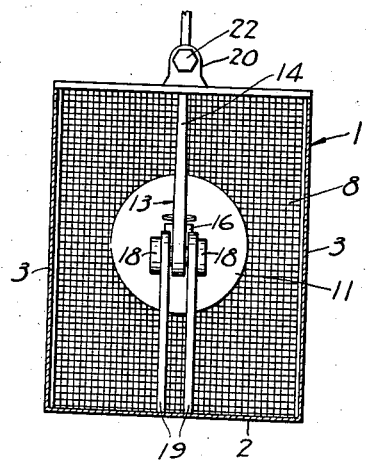
INVENTOR.
CHARLES E. KERR
BY Philip A. Minnis
ATTORNEY June 9, 1942.  C. E. KERR  2,285,586
LIQUID DENSITY RESPONSIVE APPARATUS
Filed March 22, 1939  2 Sheets-Sheet 2
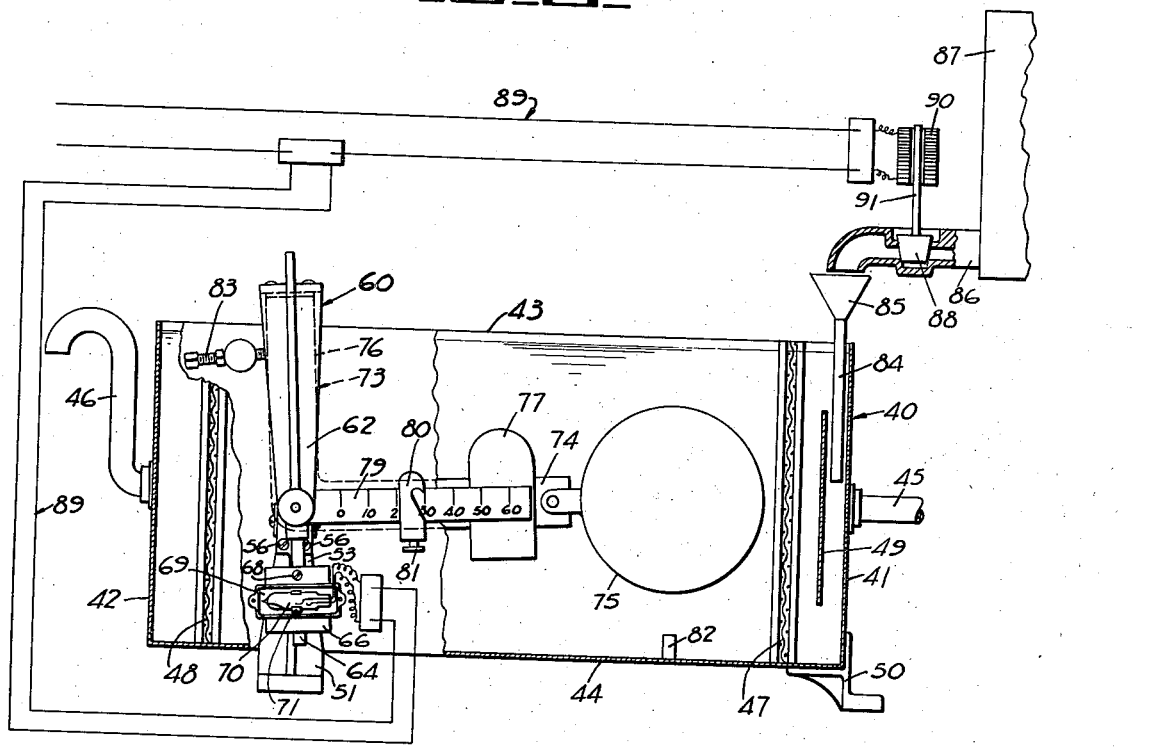
FIG_3_
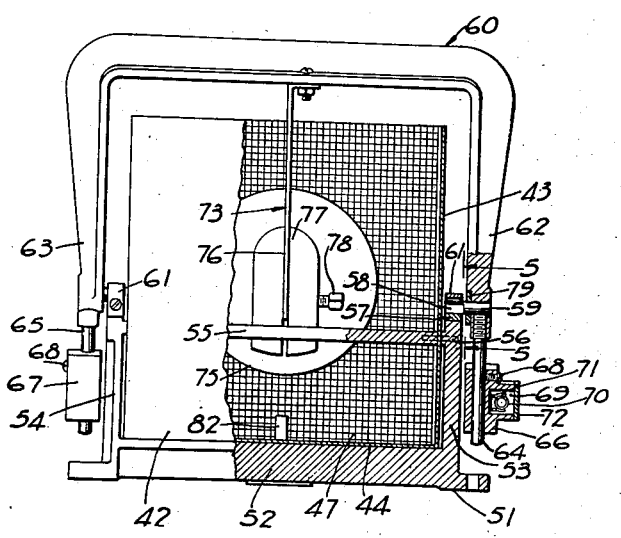
FIG_4_
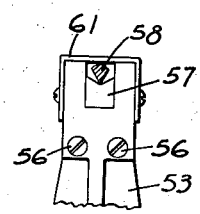
FIG_5_
INVENTOR.
CHARLES E. KERR
BY Philip A. Minnis
ATTORNEY Patented June 9, 1942

2,285,586

UNITED STATES PATENT OFFICE 2,285,586

LIQUID DENSITY RESPONSIVE APPARATUS

Charles E. Kerr, Hoopeston, Ill., assignor to Food Machinery Corporation, San Jose, Calif., a corporation of Delaware Application March 22, 1939, Serial No. 263,464

9 Claims. (Cl. 265—44)

This invention relates to the control, regulation, or measurement of the specific gravity or density of liquids.

More specifically, it contemplates improvements in apparatus responsive to changes in the specific gravity of liquids, and effective for maintaining the specific gravity of a flowing liquid constant, or for measuring and indicating the specific gravity, or variations in the same, in a body of liquid.

Certain types of apparatus employed heretofore for measuring or controlling the specific gravity of liquids, such, as, for instance, brine solutions or the like, utilize a float adapted to float upon the surface of the liquid and rise or fall dependent upon the density or specific gravity of the liquid. Other types employ a float adapted to be submerged in the liquid and to shift its position in a vertical direction according to changes in the density of the liquid. In either event, the rise or fall of the float may actuate suitable mechanism either to indicate the specific gravity on a scale or to operate means for maintaining the density of the liquid constant.

Certain objections are inherent in the floating ball type when used with liquids such as brine solutions, in that deposits and incrustations of salt upon the float at and above the normal liquid level tend to increase the weight of the float, thus rendering accurate measurements and control impractical. The submerged float type is also open to a similar objection in that the vertical arm from which the float is suspended must rise and fall through the surface of the liquid and will accumulate deposits of salt above the liquid level and thus tend to overcome the delicate balance necessary to be maintained in such instruments.

It is an object of the present invention to overcome and eliminate the above and other disadvantages and to provide an apparatus for the control or measurement of the specific gravity of liquids of simple construction and efficient and accurate operation.

Another object is to provide a device of the type indicated having no parts which move up or down through the surface of the liquid.

With these and other objects in view the invention consists in the construction, operation, and novel combination and arrangement of parts hereinafter fully described, illustrated in the accompanying drawings, and particularly pointed out in the claims hereto appended, it being understood that changes in the form, proportion, and minor details and arrangement of parts may be resorted to, within the scope of the appended claims, without departing from the spirit of the invention or sacrificing any of the advantages thereof.

While the device of the present invention is shown in the drawings and will be described hereinafter in detail in connection with a system for maintaining a uniform specific gravity in a flowing body of brine solution, it is to be understood that it is in nowise limited to this particular application but may be used in the testing and controlling of the specific gravity of various liquids, and may operate either to maintain the density constant or merely to indicate variations in the specific gravity of a given liquid.

In the drawings:

Fig. 1 illustrates a longitudinal section of a liquid density control mechanism embodying the present invention, certain parts being shown in elevation.

Fig. 2 is a transverse section of the mechanism of Fig. 1 taken along the lines 2—2 thereof, certain parts being broken away.

Fig. 3 is a longitudinal sectional view of a modified structure, certain parts being shown in elevation.

Fig. 4 shows an end view of the structure disclosed in Fig. 3, certain portions being shown in section.

Fig. 5 is an enlarged section of a portion of Fig. 4 taken along the lines 5—5 thereof and illustrating the bearing construction employed in the modified form of the present invention.

As previously mentioned, one particularly suitable application of the invention is that of controlling the density of brine solutions. Brine solutions are frequently used as a suspension medium for the gravity separation of matter, such as peas, beans, berries, whole grain corn, or the like, into particles of different specific gravity, some of which will sink and some of which will float in a brine solution of a given specific gravity. Naturally, the solution, in a continuous operation of gravity separation, must be used over and over again and will tend to lose some of its density as a result of absorption or dilution by the material being separated. Means must therefore be provided for supplementing the amount of the brine in the solution by additions from time to time of salt or concentrated brine. The device of the present invention is eminently suited for controlling the density of such solutions and is effective, dependent upon even very slight variations in the density of the brine, to actuate means for supplementing the brine content until the density has again reached a pre-determined figure.

The arrangement shown in Figs. 1 and 2 of the drawings includes a tank 1, which may be of any desired shape and size and comprises a bottom 2, side walls 3, and end walls 4 and 5. Brine solution, or other liquid to be tested or controlled, enters the tank through a pipe 6, flows through the length of the tank and leaves the same at the opposite end thereof through an overflow pipe 7, the latter preferably taking the form of a goose neck in order to maintain a predetermined liquid level within the tank 1. The tank 1 is preferably provided with transverse screens 8 and 9 adjacent the respective end walls 4 and 5 for the purpose of promoting uniform and even flow of liquid throughout the length of the tank. In addition, there is provided a baffle 10 opposite the inlet pipe 6 for the purpose of discouraging eddy currents.

A specific gravity responsive element or float 11 is positioned within the tank 1 and may be preferably in the form of a hollow ball, which is maintained at all times completely submerged in the brine solution. The float 11 is supported at the free end of a substantially horizontal arm 12 forming part of a lever structure in the form of a bell crank 13, which also includes a substantially vertical oblong shaped arm 14. The arm 12 is preferably provided with graduations in degrees Baumé as indicated at 15 and a slidable weight 16. The bell crank lever 13 is pivotally supported at its apex by means of a pivot pin 17 fixed thereto and received within bearings 18, preferably of agate or other noncorrosive material, carried by standards or bearing blocks 19 positioned upon the bottom of the tank. Thus, the upright arm 14 is free, within certain limits, to oscillate back and forth in a lateral direction as the float 11 and arm 12 rise or fall within the liquid flowing through the tank. The pivot pin 17 of the bell crank lever and the bearings 18 are positioned in such a manner with respect to the vertical arm 14 as to prevent any substantial movement of the latter in a vertical direction. The lateral movement of the arm 14 is confined by limit stops formed of brackets 20, and adjustable set screws 21 and 22.

The upper end of the upstanding arm 14 engages, by means of a ball and socket or other suitable type of connection 23, with a switch 24 of an electrical circuit indicated by the wires 25 and 26 and connected with a suitable source of electric energy. The switch 24, in the present instance, has been illustrated as a conventional mercury switch mounted upon a central pivot 27 but may, of course, take the form of any other appropriate or conventional type of switch operable to make and break an electrical circuit upon movement of the arm 14. Included in the said electrical circuit, for a purpose presently to be described, is a solenoid coil 28 surrounding a vertical armature 29.

At 30 there is shown a supply tank for holding make-up material, in the present instance comprising strong or concentrated brine solution. A discharge pipe 31 leads from the supply tank 30 and is provided with a valve 32 connected with and adapted to be controlled by the solenoid armature 29. The discharge pipe 31 terminates in a downwardly directed spout or discharge orifice 33 which is located immediately above the funnel-shaped or outwardly flaring end 34 of a pipe 35 which extends downwardly into the control tank 1 and terminates adjacent the mouth of the inlet pipe 6 at a point between the end wall 4 and the baffle 10. It will thus be manifest that, with the valve 32 in open position, additions of make-up brine will flow through the pipes 31 and 35 into the solution flowing through the tank 1 for augmenting its brine content and bringing the same up to any desired or predetermined amount.

If desired, salt in solid form may be supplied from the tank 30, and in such event the construction of the discharge conduit 31 and valve 32 may be appropriately modified to handle the granular material in a manner as will be obvious to those skilled in the art.

In the practical adaptation of the present invention, the used brine may be caused to flow from the point of use through the pipe 6, into and throughout the length of the control tank 1 in a uniform and even manner, and will discharge at the opposite end thereof through the goose neck or riser pipe 7 from whence it may be conducted back to the point of use. The goose neck 7 will, of course, maintain a predetermined normal liquid level within the tank 1 and this level is indicated at 36.

In the operation of the device, the weight 16 of the arm 12 of the bell crank lever is adjusted with its pointer 37 in alignment with the graduation line designating the given or predetermined density of the solution to be controlled and locked in such position by means of a lock screw 38. The float 11 and arm 12 will be in equilibrium relative to the liquid but move slightly upwardly to a position at which the arm 14 contacts stop 22, and the arm 12 will be in a substantially horizontal position. Under these conditions, the mercury switch 24 is in its open position as shown in Fig. 1, and the electrical circuit controlled thereby is likewise open so that there will be no current flowing through the solenoid coil 28. The weight of the valve 32, or the action of a suitable spring, not shown, will maintain the same in closed position so that no make-up salt or solution will flow out of the pipe 31 and into the tank 1. Any even slight reduction of the density of the brine flowing through the control tank will result in the float sinking or assuming a lower position within the liquid. The downward movement of the float 11 and arm 12 causes lateral movement of the arm 14 into contact with the limit stop 21, and the mercury switch 24 is tilted to a position opposite to that as shown in Fig. 1 to close the circuit of the wires 25 and 26 and energize the solenoid 28. This condition, of course, results in the raising of the armature 29 and the opening of the valve 32, so that make-up solution can flow out of the supply tank 30 through the spout 33 and pipe 35 into the control tank. Upon the brine in the tank 1 regaining its former density, the float 11 will, of course, rise, actuating the switch 24 to break the electrical circuit, de-energizing the solenoid and allowing the valve 32 to close, thus shutting off the supply of make-up material.

In other words, with the sliding weight positioned at 30 degrees Baumé, as shown in Fig. 1 of the drawings, the float 11 will not sink until the density of the brine solution drops to a point below 30° Bé. After the addition of make-up brine to the point where the solution is built up again to 30° Bé., the float will rise and prevent further additions. The density of the solution is thus constantly maintained at 30° Bé.

It will be noted, as a feature of the present invention, that the actuating arm 14 moves only in a lateral direction and for but a limited distance. It does not move into and out of the body of liquid to any appreciable degree so that salt deposits or incrustations will be an absolute minimum. Furthermore, all of the weight of the arm 14 and any salt deposits thereon, no matter how great, are carried by the bearings 18 and bearing blocks 19, so that any increased weight of the arm 14 due to such deposits cannot affect the weight or balance of the float 11 and horizontal arm 12. Thus, the instrument will be quite accurate at all times and will not be influenced by increased weight of the actuating arm due to salt deposits.

While the device of the present invention has been shown and described as actuating a switch to control an electrical circuit for opening and closing the valve 32, it is obvious that the invention is not limited to this particular environment but may find its features eminently useful and desirable in other appropriate associations. For instance, the end of the oscillating arm 14 may take the form of an indicator or pointer to be associated with a suitable template or gauge to indicate the particular specific gravity of a liquid flowing through the tank 1.

Referring now to the modified construction of the present invention as illustrated in Figs. 3, 4, and 5, 40 designates a tank structure similar to that shown in Fig. 1. The tank 40 comprises end walls 41 and 42 and the side walls 43, while reference numeral 44 designates the bottom portion thereof. Attached to the tank 40 are inlet and outlet conduits 45 and 46, respectively, the outlet conduit 46 being in the form of a goose neck for maintaining a predetermined liquid level within the tank. Transverse screens 47 and 48 are arranged interiorly of the tank and adjacent the inlet conduit 45 and outlet conduit 46, respectively, to promote uniform and even flow of the liquid within the tank. A baffle plate 49 adjacent the inlet conduit 45 and similar to that shown at 10 in Fig. 1 eliminates eddy currents in the tank 40. The tank 40 is further provided with supporting brackets 50 and 51 for attaching the same to the frame of a grading machine or the like.

The supporting bracket 51 includes a base portion 52 and a pair of uprights or standards 53 and 54. A bracing member 55 positioned within the tank 40 is employed to attach the upper portions of the standards 53 and 54 together. The bracing member 55 is secured to the tank and the standards by means of screws 56 as clearly shown in Figs. 3 and 4. In this way, the upper portions of these standards are held in proper position, and bending or deformation of the same is practically eliminated.

The uprights 53 and 54 carry at their upper ends agate bearings 57, which cooperate with knife edge members 58, of similar material, provided with cylindrical portions 59 secured to the lower end of a yoke 60 extending over the tank 40 in a transverse direction. A cover plate 61 secured to the uprights 53 and 54, adjacent the agate bearings 57 and knife edge members 58, may be provided to protect the delicate bearing mechanism against damage. The downwardly extending portions of the yoke 60, as shown at 62 and 63, carry depending rods 64 and 65 threadedly connected with said yoke portions and contacting the portion 59 of the knife edge members 58 for maintaining the same in proper position. Adjustable counterbalance weights 66 and 67 are secured to the rods 64 and 65 by means of set screws 68.

The counterweight 66 is provided with a recess 69 for reception of a mercury switch 70 detachably secured to the same by means of a spring clamp 71. A cover plate 72 attached to the counterweight 66 closes the recess 69 and protects the mercury switch 70 against damage.

Positioned within the tank 40 and secured to the upper transverse portion of the yoke 60 is an L-shaped float supporting arm 73, the horizontal portion 74 of which carries a float 75 of similar construction to that shown at 11 in Fig. 1. The vertical portion 76 of the L-shaped arm 73 extends in parallel vertical alignment with the downwardly extending portions 62 and 63 of the yoke 60. The horizontal portion 74 of the float supporting arm 73 is provided with a weight 77 slidably arranged thereon and secured in a selected position by means of a set screw 78. The weight 77 is adapted to permit calibration of the device to water balance or zero, while a scale beam 79 secured to the downwardly extending portion 62 of the yoke 60 and positioned adjacent the knife edge member 58 of the latter extends in a horizontal direction in parallel horizontal alignment with the horizontal portion 74 of the arm 73. This scale beam 79 may be graduated in degrees Baumé or calibrated in any other desired manner to indicate specific gravity or density. Slidably arranged on the scale beam 79 is a weight 80 provided with a thumb screw 81 for locking the same in any desired position on said beam. In the operation of the device this weight 80 is placed in a selected position on said scale beam according to the desired density to be maintained in the fluid in tank 40.

A limit stop 82 secured to the bottom of the tank 40 limits the downward movement of the float 75, while the upward movement of the latter is limited by an adjustable stop member 83, secured to the outside of the tank 40, and cooperating with portion 62 of the yoke 60. In this way, excessive movement of the float lever mechanism connected thereto is prevented, and the float 75 is always maintained in submerged position. The tank 40 comprises further a supply conduit 84 of a construction similar to that shown at 35 in Fig. 1. This conduit includes a funnel portion 85 which receives make-up solution from a delivery pipe 86 in communication with a supply tank 87. The delivery pipe 86 is of exactly the same construction as pipe 31 in Fig. 1 and is further similarly provided with a solenoid operated valve 88.

The mercury switch 70 is connected to an electric circuit generally indicated at 89, which also includes a solenoid 90 provided with an armature 91, which forms a part of the valve 88 above referred to.

The operation of the modified structure as shown in Figs. 3, 4, and 5 is similar to that described in reference to Fig. 1. In other words, the float 75, which is entirely submerged within a solution passing through the tank 40, will move upwardly or downwardly according to the density of the solution to be controlled by the mechanism of the present invention. The movement of the float in this manner causes corresponding rocking movement of the L-shaped float supporting arm 73, beam 79, and yoke 60 pivotally supported upon the standards 53 and 54. This rocking movement causes corresponding opening or closing of the contacts of the mercury switch 70 to thereby energize or deenergize the solenoid 90, If the solenoid 90 is energized, the valve 88 will be opened and make up material from the supply tank 87 will be supplied to the solution in the tank 40 in increase the specific gravity thereof. Upon de-energization of the solenoid, when the proper specific gravity of the solution has been restored, valve 88 closes, interrupting the supply of make-up material. In this way, the density of the solution in tank 40 can be accurately and efficiently maintained, as will be necessary for the proper quality grading of matter, such as peas, beans, or the like.

It will be noted from the foregoing description, in regard to the modified structure shown in Figs. 3 to 5, that the bearings 57 for the yoke 60, which carries the beam 79 and the L-shaped float supporting arm 73, are located outside the tank 40 and the solution contained therein, so that the same are not subjected to the corrosive effects of the latter, and the rather delicate bearing mechanism of the device is therefore fully protected against influences which may tend to impede its accuracy. In the present construction, these parts are further easily accessible so that the same may be readily cleaned when necessary to maintain the apparatus in proper functioning condition.

With the construction and operation of the apparatus as shown in Figs. 3 and 4 in mind, it must be observed that the yoke 60 and the vertical portion 76 of the float supporting arm 73 form a vertically extending structure pivotally supported by the knife edge members 58 upon the bearings 57. The vertically extending structure has to be carefully statically balanced so that during its rocking movement in a lateral direction no weight of its mass is added to or deducted from the weight of the float 75, as this would very materially effect the accuracy of the device; in fact, an unbalanced structure would be entirely unsatisfactory for the purposes of the present invention. The proper balancing is obtained by adjustment of the counterweights 66 and 67 suspended from the yoke structure a considerable distance below the bearings 57 by means of the rods 64 and 65. This balance adjustment must be effected with the float supporting arm 73 and beam 79 disconnected from the yoke, while a part, representing the vertical float supporting arm portion 76 of the exact weight and configuration of the latter, is temporarily attached to the yoke.

After the vertically extending structure has been statically balanced, the float supporting arm 73, weight 77, float 75, scale beam 79, and weight 80 are assembled and attached to the yoke 60, and the tank 40 is filled with water to the proper level determined by the outlet conduit 46. The weight 77 is now shifted to a position on the horizontal portion 74 of the float arm 73 at which the float 75 is in equilibrium with respect to the water in the tank and just begins to move upwardly, rocking the yoke 60 in a lateral direction so that the mercury switch opens the electric circuit causing de-energization of the solenoid and closing of valve 88, and at this position, the weight 77 is permanently locked on the arm 73. During the above mentioned adjustment, the weight 80 is maintained locked at its zero position on the beam 79, and the apparatus is therefore adjusted to zero or water balance. Subsequent adjustments of the weight 80 in accordance with the graduations on beam 79 enable setting of the device for controlling liquid of any desired degree of density.

It should further be noted that the only moving part extending out of the solution to be controlled is the portion 76 of the L-shaped arm 73. This arm portion 76, similar to portion 14 in Fig. 1, rocks laterally during rising and falling of the float 75, and it is therefore of importance that the bearings for the yoke 60 are so positioned with respect to said arm portion 76 as to eliminate any substantial up or down movement of the latter into or out of the liquid in the tank 40, so as to prevent the formation of excessive salt deposits or incrustations thereon. In other words, the bearings 57 are in alignment with the apex portion of the float arm 73.

In the operation of the control mechanism, the float 75 will either assume its upper or lower position defined by the limit stops 83 or 82, respectively, and therefore, after calibration of the device in a manner as explained above, the mercury switch 70 may be adjusted so as to utilize the entire movement of the float 75 for effecting the opening and closing of said switch.

While I have described a particular embodiment of the present invention, it will be understood that various changes and modifications may be made without departing from the spirit of the present invention and the scope of the appended claims.

Having now described my invention and in what manner the same may be used, what I claim as new and desire to protect by Letters Patent is:

1. In a liquid density responsive apparatus: a tank for containing liquid; a lever structure positioned in said tank and comprising a normally substantially horizontal arm disposed beneath the liquid level and a normally substantially vertical arm projecting above the liquid level; a specific gravity responsive element carried by said horizontal arm in position for total submersion within the liquid; and means pivotally mounting said lever structure to cause the specific gravity responsive element to impart lateral rocking movement to said vertical arm as the specific gravity responsive element rises and falls in response to changes in the density of the liquid, said vertical arm being so proportioned and positioned with respect to said horizontal arm that its submerged and unsubmerged areas remain substantially constant during such rocking movement.

2. In a device for controlling the specific gravity of liquids including a tank for containing liquid to be controlled, a yoke transversely positioned above said tank, an arm on said yoke having a substantially vertical portion extending into the liquid in said tank, and a substantially horizontal portion submerged in the liquid, a submerged specific gravity responsive element on said horizontal portion, bearing means exterior of said tank for supporting said yoke for lateral rocking movement, counterbalancing means for statically balancing said yoke and vertical portion of said arm, a graduated scale beam on said yoke exterior of said tank and extending in alignment with the horizontal portion of said arm, a weight on said scale beam adjustable for balancing said specific gravity responsive element relative to liquid of predetermined specific gravity, and stop means for limiting the rocking movement of said yoke.

3. In a liquid density responsive apparatus, including a tank for containing the liquid, a normally upright movable arm mounted for partial projection into and out of the liquid, a specific gravity responsive element mounted for total submersion in the liquid and movable up and down in the liquid in response to changes in density of the liquid, and means disposed beneath the liquid level connecting said arm to said specific gravity responsive element to impart lateral actuation to the arm by the specific gravity responsive element in a direction to maintain the submerged area of the arm substantially constant.

4. In a liquid density responsive device including a tank for containing liquid, a lever structure disposed in said tank, said lever structure including a normally substantially horizontal portion submerged in the liquid in said tank and a normally substantially vertical portion extending out of said liquid, means exterior of said tank for pivotally supporting said lever structure for lateral movement of the vertical portion thereof in a direction to maintain the submerged area of said vertical portion substantially constant, and a specific gravity responsive element on said horizontal portion and submerged in said liquid.

5. In apparatus for controlling the density of liquids including a tank for containing liquid to be controlled, a lever structure, pivot means for pivotally suspending said lever structure relative to said tank, the lever structure including an upright arm projecting out of the liquid and a pair of laterally extending arms, one of said lateral arms being submerged in the liquid in said tank, and the other being disposed exteriorly of the tank, a submerged specific gravity responsive element on said submerged laterally extending arm, and means carried by the other laterally extending arm for balancing the specific gravity responsive element and lever structure relative to liquid of a predetermined density within said tank.

6. In a liquid density responsive device including a tank for containing liquid, a lever structure, pivot means for pivotally mounting said lever structure relative to said tank, the lever structure including an upright substantially oblong shaped arm projecting out of the liquid and a pair of laterally extending arms, one of said lateral arms being submerged in the liquid in said tank, and the other being disposed exteriorly of the tank, a submerged specific gravity responsive element on said submerged laterally extending arm, instrumentalities for statically balancing the upright arm, means for calibrating the specific gravity responsive element and laterally extending arms to water balance, and means for balancing the specific gravity responsive element and lever structure relative to liquid of a predetermined density within said tank.

7. In a liquid density responsive apparatus for use with brine solutions or the like, wherein the solution is circulated through a tank and a specific gravity responsive element submerged in the solution in said tank is utilized to actuate a device for adding renewal material to the solution in response to variations in the density of said solution: the improvement comprising a normally upright arm operatively associated with said device for adding renewal material and partially disposed in the solution in said tank so that the upper end of said arm projects above the solution level, means pivotally mounting said arm for lateral rocking movement, and a second arm wholly submerged in the solution in said tank and extending laterally with respect to said upright arm, said second arm carrying said specific gravity responsive element in position for total submersion in the solution and being operatively associated with said upright arm to actuate the latter as the specific gravity responsive element rises and falls in the solution in response to variations in the density of the solution.

8. In a liquid density responsive apparatus for use with brine solutions or the like, wherein the solution is circulated through a tank and a specific gravity responsive element submerged in the solution in said tank is utilized to actuate a device for adding renewal material to the solution in response to variations in the density of said solution: the improvement comprising a normally upright arm operatively associated with said device for adding renewal material and partially disposed in the solution in said tank so that the upper end of said arm projects above the solution level, and means disposed beneath the solution level connecting said arm to said submerged specific gravity responsive element to impart lateral actuation to the arm as the specific gravity responsive element rises and falls in the solution in response to variations in the density of the solution, said arm being secured against longitudinal movement thereof.

9. In a liquid density responsive apparatus for use with brine solutions or the like, wherein the solution is circulated through a tank and a specific gravity responsive element submerged in the solution in said tank is utilized to actuate a device for adding renewal material to the solution in response to variations in the density of said solution: the improvement comprising a lever structure positioned in said tank and including a normally upright arm projecting into and out of the solution and a laterally extending arm disposed beneath the solution level, said upright arm being operatively associated with said device for adding renewal material, and said laterally extending arm carrying said submerged specific gravity responsive element, and means pivotally mounting said lever structure to cause the specific gravity responsive element to impart lateral rocking movement to said upright arm as the specific gravity responsive element rises and falls in the solution in response to variations in the density of the solution.

CHARLES E. KERR.